United States Patent
Kamemura et al.

(10) Patent No.: US 9,822,882 B2
(45) Date of Patent: *Nov. 21, 2017

(54) SEALING DEVICE

(71) Applicant: NOK CORPORATION, Tokyo (JP)

(72) Inventors: Makoto Kamemura, Fukushima (JP); Hideharu Hyakutake, Fukushima (JP)

(73) Assignee: NOK Corporation (JP)

( * ) Notice: Subject to any disclaimer, the term of this patent is extended or adjusted under 35 U.S.C. 154(b) by 189 days.

This patent is subject to a terminal disclaimer.

(21) Appl. No.: 14/890,289

(22) PCT Filed: Oct. 29, 2013

(86) PCT No.: PCT/JP2013/079185
§ 371 (c)(1),
(2) Date: Nov. 10, 2015

(87) PCT Pub. No.: WO2014/184972
PCT Pub. Date: Nov. 20, 2014

(65) Prior Publication Data
US 2016/0116067 A1    Apr. 28, 2016

(30) Foreign Application Priority Data

May 14, 2013 (JP) .................................. 2013-101975

(51) Int. Cl.
*F16J 15/3244* (2016.01)
*F16J 15/3204* (2016.01)

(52) U.S. Cl.
CPC ....... *F16J 15/3244* (2013.01); *F16J 15/3204* (2013.01)

(58) Field of Classification Search
CPC .................................................. F16J 15/3244
See application file for complete search history.

(56) References Cited

U.S. PATENT DOCUMENTS 3,973,781 A * 8/1976 Grorich .................. F16C 33/22
277/352
4,118,856 A * 10/1978 Bainard ............... F16J 15/3244
264/295
(Continued)

FOREIGN PATENT DOCUMENTS

EP    1479949 A1    11/2004
GB    2301154 A     11/1996
(Continued)

OTHER PUBLICATIONS

Extended European Search Report for Patent Application No. EP13884928.6 dated Apr. 4, 2016 (7 pages).

*Primary Examiner* — Vishal Patel
(74) *Attorney, Agent, or Firm* — Harness, Dickey & Pierce, P.L.C.

(57) ABSTRACT

A sealing device is provided with a seal lip which extends toward a sealing space side, a lip edge and an opposite sealing space side conical surface are formed in an inner peripheral surface of the seal lip, the lip edge being slidably brought into close contact with an outer peripheral surface of a rotating body, and the opposite sealing space side conical surface being larger in diameter from the lip edge toward an external space side, a plurality of screw protrusions are formed in the opposite sealing space side conical surface, the screw protrusions generating a screw pump action toward the lip edge side on the basis of rotation of the rotating body in a fixed direction, and a desired number of dust capture portions are formed in a hem portion of each of the screw protrusions, thereby preventing dusts from being bitten into the lip edge sliding portion.

2 Claims, 5 Drawing Sheets

(56) References Cited

U.S. PATENT DOCUMENTS

| | | | | |
|---|---|---|---|---|
| 4,183,543 A * | 1/1980 | Antonini | | F16J 15/3244 277/559 |
| 5,222,743 A * | 6/1993 | Goldswain | | F16J 15/3412 277/400 |
| 5,441,283 A * | 8/1995 | Pecht | | F16J 15/3412 277/400 |
| 5,759,466 A * | 6/1998 | Onuma | | F16J 15/328 264/138 |
| 5,915,696 A | 6/1999 | Onuma et al. | | |
| 6,036,193 A | 3/2000 | Onuma et al. | | |
| 6,276,691 B1 * | 8/2001 | Nishigaki | | F16J 15/3244 264/161 |
| 6,726,213 B2 * | 4/2004 | Wang | | F16J 15/348 277/400 |
| 6,729,624 B1 * | 5/2004 | Johnston | | F16J 15/3244 277/351 |
| 7,931,277 B2 * | 4/2011 | Garrison | | F01D 25/183 277/399 |
| 2005/0127613 A1 * | 6/2005 | Furuyama | | F16J 15/3244 277/529 |
| 2007/0182104 A1 * | 8/2007 | Matsui | | F16J 15/3244 277/549 |
| 2009/0200750 A1 * | 8/2009 | Takeno | | F16J 15/324 277/569 |
| 2010/0194055 A1 * | 8/2010 | Syamoto | | F16J 15/3244 277/549 |
| 2015/0097344 A1 * | 4/2015 | Hamamoto | | F16J 15/3244 277/550 |
| 2016/0252181 A1 * | 9/2016 | Hyakutake | | F16J 15/3244 |

FOREIGN PATENT DOCUMENTS

| | | |
|---|---|---|
| JP | H03029768 U | 3/1991 |
| JP | H07-208611 A | 8/1995 |
| JP | H0942463 A | 2/1997 |
| JP | 2001027326 A | 1/2001 |
| JP | 3278349 B2 | 4/2002 |
| JP | 2003-056718 A | 2/2003 |
| JP | 2003-090439 A | 3/2003 |
| JP | 2006125454 A | 5/2006 |
| JP | 2013061022 A | 4/2013 |

* cited by examiner

SEALING DEVICE

CROSS-REFERENCE TO RELATED APPLICATIONS

This application is a U.S. National Phase application under 35 U.S.C. 371 of International Application No. PCT/JP2013/079185, filed Oct. 29, 2013 and published in Japanese as WO 2014/184972 A1 on Nov. 20, 2014. This application claims priority to Japanese Patent Application 2013-101975, filed on May 14, 2013. The entire disclosures of the above applications are incorporated herein by reference.

BACKGROUND OF THE INVENTION

Field of the Invention

The present invention relates to a sealing device sealing an outer periphery of a rotating body in a motor vehicle, a general machine, an industrial machine and the like by a seal lip, and particularly relates to a sealing device in which a screw protrusion for obtaining a sealing performance on the basis of a screw pump action is formed in a seal lip.

Description of the Conventional Art

FIG. 5 shows an example of a sealing device according to a prior art in which a screw protrusion for obtaining a sealing performance on the basis of a screw pump action is formed in a seal lip. The sealing device 100 is provided with a seal lip 110 which is integrally formed by a rubber-like elastic material (a rubber material or a synthetic resin material having a rubber-like elasticity) in a reinforcing ring 120 made of a metal, and is structured such that a sealing space side conical surface 112 and an opposite sealing space side conical surface 113 are formed in an inner peripheral surface of the seal lip 110 while setting a lip edge 111 having the smallest diameter, the sealing space side conical surface 112 being larger in diameter toward a sealing space (a machine inside) A side and the opposite sealing space side conical surface 113 being larger in diameter toward an opposite sealing space side (an opposite side to the sealing space A). Further, a lot of screw protrusions 114 extending at a predetermined angle of incline in relation to a circumferential direction are formed in the opposite sealing space side conical surface 113. Each of the screw protrusions 114 is formed into a bilge shape in which a height and a width change little by little so that the height and the width are the maximum in an intermediate portion in a longitudinal direction, and a leading end thereof extends to the lip edge 111. Further, a garter spring 130 for compensating a tension force is installed to an outer peripheral portion of the seal lip 110.

The sealing device 100 is structured such as to inhibit the oil to be sealed in the sealing space A from leaking from a shaft periphery to an external space (the opposite sealing space) B side since a whole periphery of the lip edge 111 in the seal lip 110 is slidably brought into close contact with an outer peripheral surface of a rotating shaft 200. Particularly, since the screw protrusions 114, 114, . . . bring about the screw pump action together with the rotation of the rotating shaft 200 in a direction R, that is, an action of pushing the oil to be sealed which is going to leak around the shaft periphery to the external space B side, back to the sealing space A side, an excellent sealing performance is achieved (refer, for example, to Japanese Patent No. 3278349).

SUMMARY OF THE INVENTION

Problem to be Solved by the Invention

According to this kind of sealing device 100, the screw protrusions 114 achieve the action of pushing the oil to be sealed which is going to the external portion after passing through the sliding portion between the outer peripheral surface of the rotating shaft 200 and the lip edge 111 from the sealing space A, back to the sealing space A side. On the other hand, the screw protrusions 114 achieve the action that dusts entering into a seal inner peripheral space C from the external space B side come into collision with the screw protrusions 114 on the basis of a centrifugal force caused by rotation of air in the direction R together with the rotation of the rotating shaft 200 and move to the lip edge 111 side along a hem portion thereof. As a result, there is a risk that the dusts entering from the external space B side are bitten into the sliding portion of the lip edge 111 and a gap is generated accordingly so as to induce leakage.

The present invention is made by taking the above points into consideration, and a technical object of the present invention is to prevent dusts entering from an external portion from being bitten into a sliding portion of a lip edge, in a sealing device in which screw protrusions are formed in an opposite sealing space side conical surface in a seal lip.

Means for Solving the Problem

As a means for effectively solving the technical object mentioned above, a sealing device according to the invention of a first aspect is provided with a seal lip which extends toward a sealing space side, a lip edge and an opposite sealing space side conical surface are formed in an inner peripheral surface of the seal lip, the lip edge being slidably brought into close contact with an outer peripheral surface of a rotating body, and the opposite sealing space side conical surface being larger in diameter from the lip edge toward an external space side, a plurality of screw protrusions are formed in the opposite sealing space side conical surface, the screw protrusions generating a screw pump action toward the lip edge side on the basis of rotation of the rotating body in a fixed direction, and a desired number of dust capture portions are formed in a hem portion of each of the screw protrusions.

A sealing device according to the invention of a second aspect is the structure described in the first aspect, wherein the screw protrusions are constructed by a first screw protrusion which extends from the lip edge and is approximately uniform in its height and width, and a second screw protrusion which extends from an end portion in an opposite side to the lip edge in the first screw protrusion, is changed little by little so that a width and a protruding height from the opposite sealing space side conical surface are the largest in an intermediate portion in a length direction, and is formed into a bilge shape, and the dust capture portions are formed at predetermined intervals along the hem portion of the second screw protrusion.

A sealing device according to the invention of a third aspect is the structure described in the first or second aspect, wherein the dust capture portion is constructed by a notch or a concave portion.

Effect of the Invention

On the basis of the sealing device according to the present invention, since the dusts coming into collision with the screw protrusions on the basis of the air rotation together with the rotation of the rotating shaft and moving to the lip edge side are captured by the dust capture portion which is formed in the hem portions of the screw protrusions, it is possible to effectively prevent the sealing performance from being lowered by the dusts being bitten into the sliding portion of the lip edge.

Further, in the case that the screw protrusions are constructed by the first screw protrusion in the lip edge side, and the bilge shaped second screw protrusion closer to the lip edge side than the first screw protrusion, the dusts are captured by the dust capture portions which are formed at the predetermined intervals along the hem portion of the second screw protrusion, thereby preventing the dusts from being entered into and piled up in the first screw protrusion side and effectively preventing the sealing performance from being lowered.

DETAILED DESCRIPTION OF PREFERRED EMBODIMENTS

A description will be given below of preferable embodiments of a sealing device according to the present invention with reference to the accompanying drawings. First of all, FIGS. 1 and 2 show a first embodiment.

Figure 1:
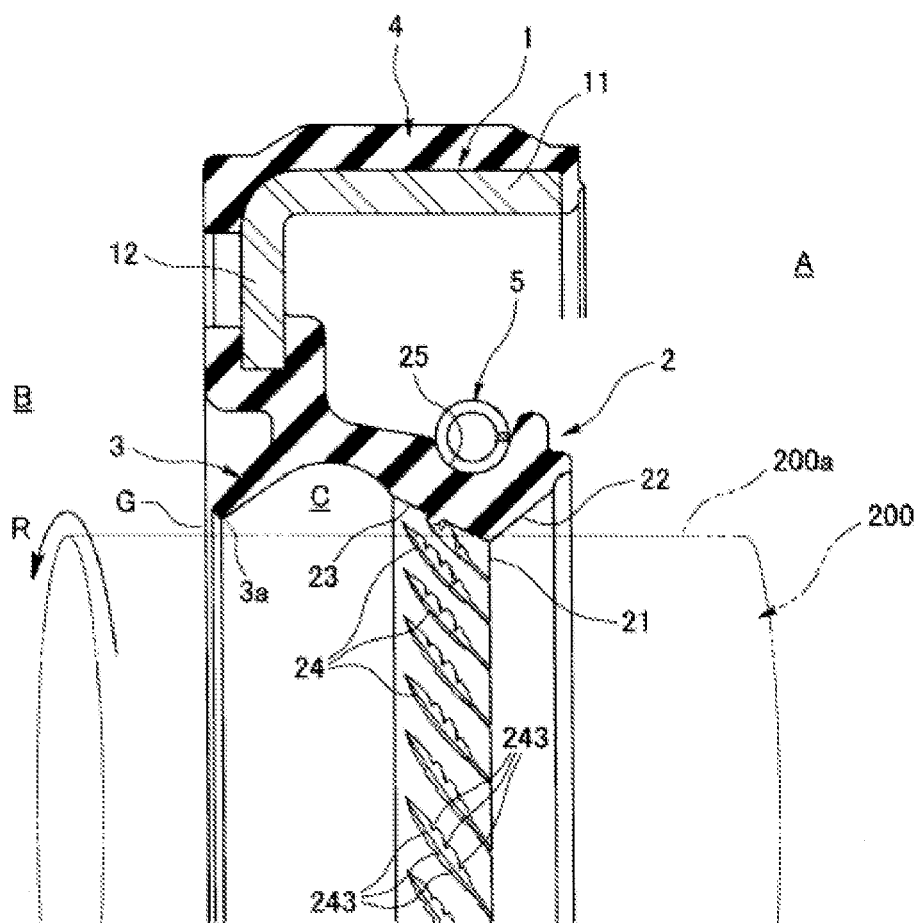
FIG. 1 is a one-side cross-sectional view showing a first embodiment of a sealing device according to the present invention.
Figure 2:
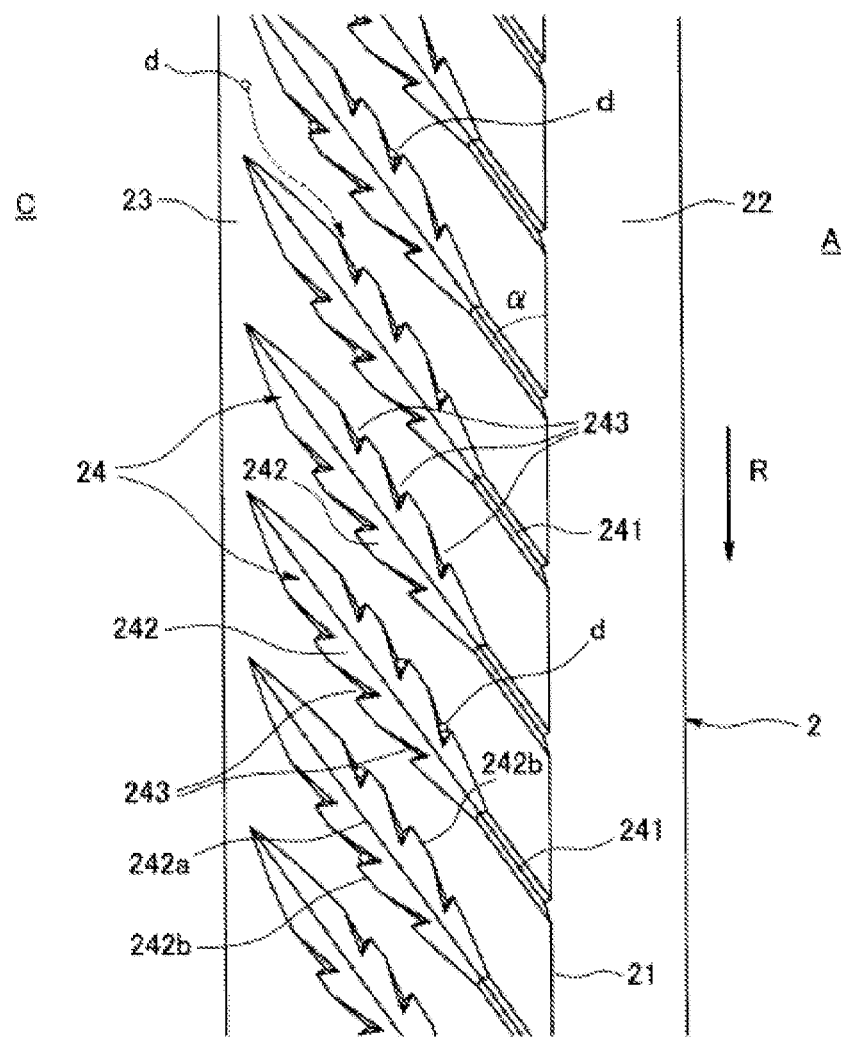
FIG. 2 is a partly development view of an inner peripheral surface of a seal lip in FIG. 1.

More specifically, the sealing device according to the first embodiment is structured, as shown in FIG. 1, such that a seal lip 2, a dust lip 3 and an outer peripheral seal portion 4 which are made of a rubber-like elastic material (a rubber material or a synthetic resin material having a rubber-like elasticity) are integrally formed in a reinforcing ring 1 which is made of a metal. Further, a garter spring 5 is installed to an outer peripheral surface in the vicinity of a leading end of the seal lip 2.

The reinforcing ring 1 is manufactured by punching press molding a steel plate, and is constructed by an outer diameter tube portion 11, and an inward collar portion 12 which extends to an inner diameter side from an end portion in an opposite sealing space side of the outer diameter tube portion 11 in an installed state.

The seal lip 2 extends from an inner diameter end portion of the inward collar portion 12 in the reinforcing ring 1 to a direction of a sealing space A side in the installed state, and is formed in its inner periphery in the vicinity of the leading end a lip edge 21 which is slidably brought into close contact with an outer peripheral surface 200a of a rotating shaft 200 and is formed into a chevron cross-sectional shape, and a sealing space side conical surface 22 which is larger in diameter toward the sealing space A side and an opposite sealing space side conical surface 23 which is larger in diameter toward an opposite side to the sealing space A, while setting the lip edge 21 to a boundary. The rotating shaft 200 corresponds to a rotating body described in claim 1.

A lot of screw protrusions 24, 24, . . . having leading ends reaching the lip edge 21 are formed in the opposite sealing space side conical surface 23 in the seal lip 2 at predetermined pitches in a circumferential direction. The screw protrusions 24, 24, . . . extend at a predetermined angle of incline α toward a rotating direction (a direction R) of the rotating shaft, as shown in FIG. 2, and generate a screw pump action of feeding out fluid rotating together with the outer peripheral surface 200a of the rotating shaft 200 to the lip edge 21 side as the outer peripheral surface 200a moves in the direction R on the basis of the rotation of the rotating shaft 200.

Each of the screw protrusions 24 is formed into a chevron shape in a cross section which is orthogonal to an extending direction thereof, and is constructed by a first screw protrusion 241 which extends from the lip edge 21 and is approximately uniform in its height and width, and a second screw protrusion 242 which extends from an end portion in an opposite side to the lip edge 21 in the first screw protrusion 241, changes little by little so that its width and its protruding height from the opposite sealing space side conical surface 23 are the largest in an intermediate portion in a length direction, and is formed into a bilge shape. Further, the second screw protrusion 242 is formed at a protruding height so that its ridge portion 242a curved like a keel shape of a bilge do not come into contact with the outer peripheral surface 200a of the rotating shaft 200 at least in an initial state in which any wear is not generated.

A plurality of dust capturing notches 243 are formed in hem portions (board portions) 242b and 242b in both sides in a width direction of the bilge shaped second screw protrusion 242 at predetermined intervals in a length direction. The dust capturing notches 243 correspond to the dust capture portion described in Claim 1 and are formed into an approximately V-shaped form.

The dust lip 3 extends like a conical tubular shape from a position in an inner peripheral side of the inward collar portion 12 of the reinforcing ring 1 to an opposite side to the seal lip 2 (to a direction coming close to the external space B side in an installed state), and a leading end portion 3a of the dust lip 3 is not in contact with the outer peripheral surface 200a of the rotating shaft 200 via a slight gap G so as to prevent a seal inner peripheral space C in an inner side of the dust lip 3 from being a negative pressure due to the screw pump function by the screw protrusion 24 of the seal lip 2.

The outer peripheral seal portion 4 is formed by a rubber-like elastic material connected to the seal lip 2 and the dust lip 3, the rubber-like elastic material wrapping around an outer peripheral side of the outer diameter tube portion 11 of the reinforcing ring 1, and is closely fitted and fixed to an inner peripheral surface of a housing (not shown) in a state in which the outer peripheral seal portion 4 is appropriately compressed in a diametrical direction.

The garter spring 5 is obtained by annularly connecting a metal coil spring, and is fitted and attached to an annular groove 25 which is formed in an outer peripheral surface in the vicinity of the leading end in the seal lip 2.

The sealing device having the structure mentioned above is pressed into and installed to an inner peripheral surface of the housing (not shown) so that the seal lip 2 is directed to the sealing space A side, and is structured such as to prevent an oil to be sealed in the sealing space A from leaking to the external space B side from a shaft periphery since the lip edge portion 21 in the seal lip 2 is slidably brought into close contact with the outer peripheral surface 200a of the rotating shaft 200.

Here, when the outer peripheral surface 200a moves in the direction R on the basis of the rotation of the rotating shaft 200, the fluid existing in the outer periphery of the rotating shaft 200 moves (turns together) in the direction R on the basis of the contact with the outer peripheral surface 200a of the rotating shaft 200. As a result, in the side closer to the external space B than the sliding portion of the lip edge 21 in the seal lip 2, the screw protrusions 24, 24, . . . formed in the opposite sealing space side conical surface 23 bring about a screw pump action of feeding out the fluid turning together in the direction R to the lip edge portion 21 side. Particularly, since the end portion of the lip edge 21 side of the first screw protrusion 241 in each of the screw protrusions 24 and its vicinity come into close contact with the outer peripheral surface 200a of the rotating shaft 200, they achieve a significant screw pump action. As a result, even if the oil to be sealed in the sealing space A is going to leak to the external space B side (the seal inner peripheral space C) after passing through the sliding portion of the lip edge 21, the oil is pushed back to the sealing space A side by the screw pump action. Therefore, the leakage of the oil to be sealed is effectively prevented, and a liquid lubrication film is formed in the sliding portion by the oil to be sealed, so that a good lubricating performance can be secured.

On the other hand, since the leading end portion 3a of the dust lip 3 is not in contact with the outer peripheral surface 200a of the rotating shaft 200 with the slight gap G, a part of the external dusts enters into the seal inner peripheral space C between the dust lip 3 and the seal lip 2 through the gap G, under an environment that the external space B has a lot of dusts. However, since the air rotation in the direction R is generated in the seal inner peripheral space C together with the rotation of the rotating shaft 200, the dust d comes into collision with the second screw protrusion 242 due to a centrifugal force in the process that the dust d flows in the direction R together with the air along the outer peripheral portion of the seal inner peripheral space C, moves to the lip edge 21 side along the hem portion 242b, and is captured by the dust capturing notch 243 in the moving process, as shown by a broken arrow in FIG. 2. As a result, the dust d is prevented from entering into and being piled up to the first screw protrusion 241 side, and it is possible to effectively prevent reduction of the sealing performance caused by the dust d being bitten into the sliding portion of the lip edge 21.

Figure 3:
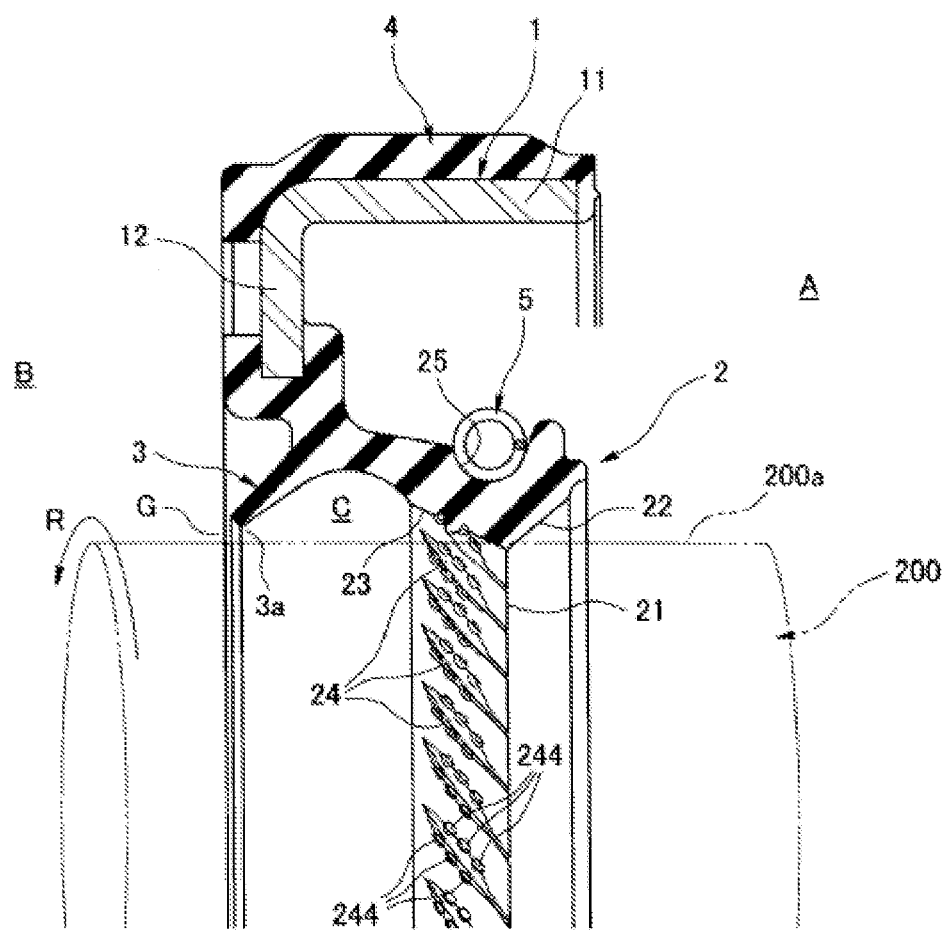
FIG. 3 is a one-side cross-sectional view showing a second embodiment of the sealing device according to the present invention.
Figure 4:
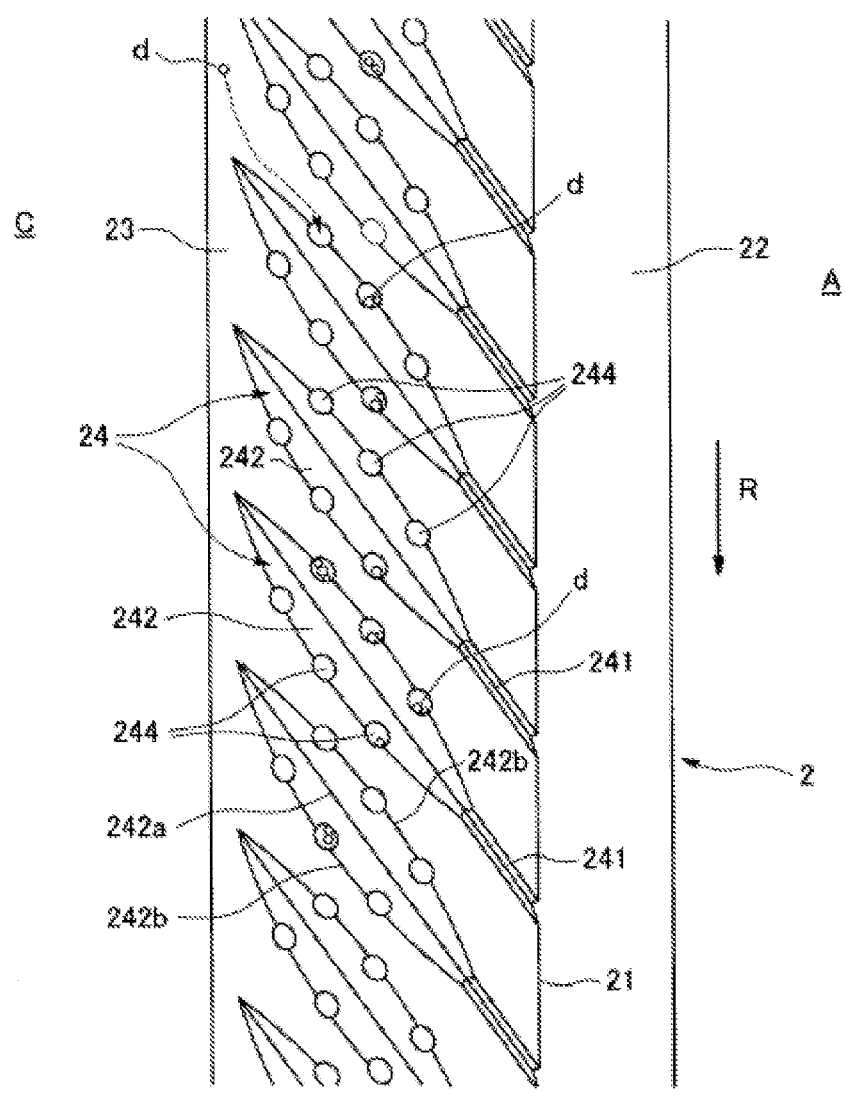
FIG. 4 is a partly development view of an inner peripheral surface of a seal lip in FIG. 3.
Figure 5:
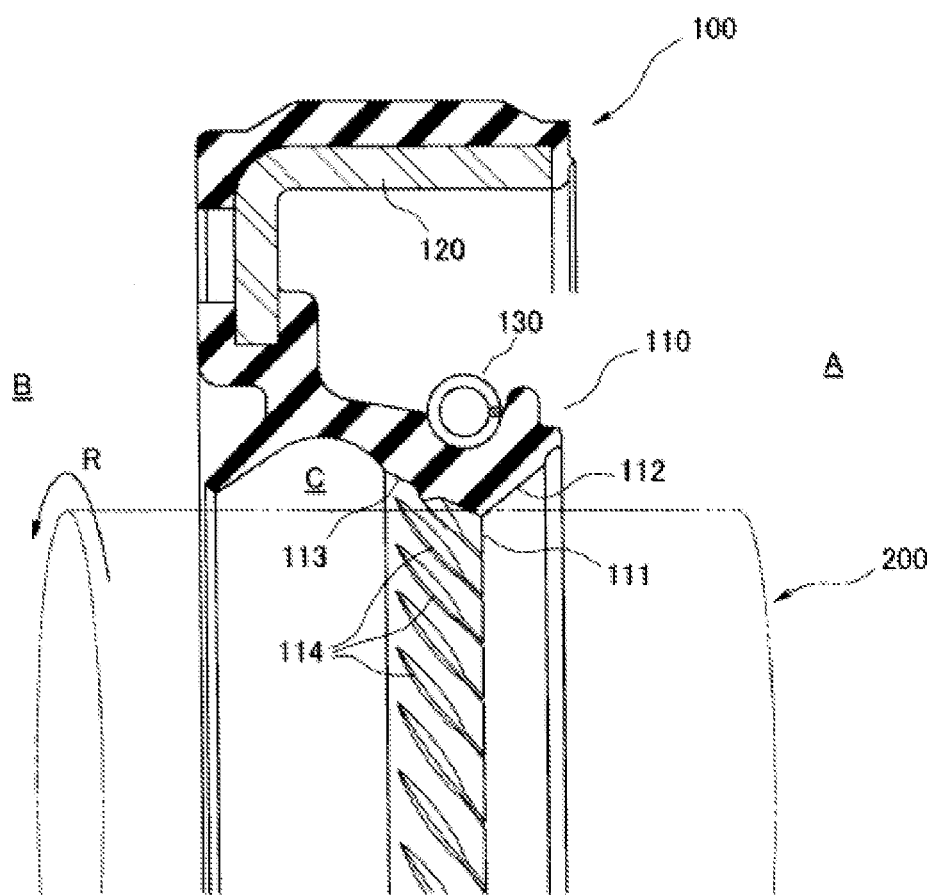
FIG. 5 is a one-side cross-sectional view showing an example of a sealing device according to a prior art.

Next, FIGS. 3 and 4 show a second embodiment of the sealing device according to the present invention.

A different portion in the embodiment from the first embodiment mentioned above exists in a matter that a plurality of dust capturing concave portions 244 are formed as the dust capture portion described in the first aspect in hem portions (board portions) 242b and 242b in both sides in a width direction of the bilge shaped second screw protrusion 242, at predetermined intervals in a length direction. The dust capturing concave portion 244 is formed so as to notch the hem portion (the board portion) 242b and bore the opposite sealing space side conical surface 23.

In the structure, the leakage of the oil to be sealed can be effectively prevented and the good lubricating performance can be secured, by the screw pump action of the screw protrusions 24, 24, . . . , closer to the external space B than the sliding portion of the lip edge 21 in the seal lip 2, in the same manner as the first embodiment.

Further, since the air rotation in the direction R together with the rotation of the rotating shaft 200 is generated in the seal inner peripheral space C even if a part of the external dusts enters into the seal inner peripheral space C through the gap G between the leading end portion 3a of the dust lip 3 and the outer peripheral surface 200a of the rotating shaft 200, the dust d comes into collision with the bilge shaped second screw protrusion 242 in the process that the dust d flows in the direction R together with the air along the outer peripheral portion of the seal inner peripheral space C, moves to the lip edge 21 side along the hem portion 242b, and is captured by the dust capturing concave portion 244 in the moving process, as shown by a broken arrow in FIG. 4. As a result, the dust d is prevented from entering into and being piled up to the first screw protrusion 241 side, and it is further possible to effectively prevent the reduction of the sealing performance caused by the dust d being bitten into the sliding portion of the lip edge 21.

In each of the embodiments, the description is given on the assumption that the leading end portion 3a of the dust lip 3 is not in contact with the outer peripheral surface 200a of the rotating shaft 200, however, in the environment that the external space B has a lot of dusts, the dust entering into the seal inner peripheral space C is generated by suction due to eccentricity and slide rotation under the environment having a lot of dusts, even in the case that the dust lip 3 is brought into close contact with the outer peripheral surface 200a of the rotating shaft 200 with a fastening margin. As a result, the present invention can achieve an excellent effect even in this case.

What is claimed is:

1. A sealing device comprising:
    a seal lip which extends toward a sealing space side,
    wherein a lip edge and an opposite sealing space side conical surface are formed in an inner peripheral surface of the seal lip, the lip edge being slidably brought into close contact with an outer peripheral surface of a rotating body, and the opposite sealing space side conical surface being larger in diameter from the lip edge toward an external space side,
    wherein a plurality of screw protrusions are formed in said opposite sealing space side conical surface, the plurality of screw protrusions being arranged in parallel, and the screw protrusions generating a screw pump action toward said lip edge side on the basis of rotation of said rotating body in a fixed direction,
    wherein the screw protrusions are constructed by a first screw protrusion which extends from the lip edge and is approximately uniform in its height and width, and a second screw protrusion which extends from an end portion in an opposite side to the lip edge in the first screw protrusion, is changed little by little so that a width and a protruding height from the opposite sealing space side conical surface are the largest in an intermediate portion in a length direction, and is formed into a bilge shape,
    wherein a desired number of dust capture portions are formed in a hem portion of each of the screw protrusions, and
    wherein the dust capture portions are formed at predetermined intervals along each side of the hem portion of said second screw protrusion.

2. The sealing device according to claim 1, wherein the dust capture portion is constructed by a notch or a concave portion.

* * * * *